United States Patent
Henon et al.

(10) Patent No.: US 10,254,461 B2
(45) Date of Patent: Apr. 9, 2019

(54) VISUAL AUGMENTATION OF AN EDGE OF A DISPLAY SURFACE

(71) Applicant: Johnson Controls Automotive Electronics SAS, Cergy-Pontoise (FR)

(72) Inventors: Fabrice Henon, Cergy (FR); Yves Lambert, Osny (FR); Nicolas Louvieaux, Parnes (FR); Hirokatsu Nakajima, Yokohama (JP); Ulf K. Langkamp, Holland, MI (US); Brook R. Burg, Grand Rapids, MI (US); Jonathan M. Frens, Hudsonville, MI (US)

(73) Assignee: Johnson Controls Automotive Electronics SAS, Cergy-Pontoise (FR)

( * ) Notice: Subject to any disclaimer, the term of this patent is extended or adjusted under 35 U.S.C. 154(b) by 267 days.

(21) Appl. No.: 15/034,117

(22) PCT Filed: Nov. 4, 2013

(86) PCT No.: PCT/US2013/068301
§ 371 (c)(1),
(2) Date: May 3, 2016

(87) PCT Pub. No.: WO2015/065490
PCT Pub. Date: May 7, 2015

(65) Prior Publication Data
US 2016/0288705 A1    Oct. 6, 2016

(51) Int. Cl.
*B60Q 3/18*    (2017.01)
*B60Q 3/64*    (2017.01)
(Continued)

(52) U.S. Cl.
CPC .............. *G02B 6/001* (2013.01); *B60K 35/00* (2013.01); *B60Q 3/18* (2017.02); *B60Q 3/64* (2017.02);
(Continued)

(58) Field of Classification Search
CPC ................ G02B 27/01; G02B 27/0101; G02B 2027/0154; B60Q 3/18; B60Q 3/64; B60Q 3/78
See application file for complete search history.

(56) References Cited

U.S. PATENT DOCUMENTS 5,519,536 A * 5/1996 Hoehn ................... B60K 35/00
353/13
5,677,701 A * 10/1997 Okuyama .............. B60K 37/02
345/7

(Continued)

FOREIGN PATENT DOCUMENTS

EP    0 202 460 A2    11/1986
JP    2000-203308 A    7/2000
(Continued)

OTHER PUBLICATIONS

International Search Report in PCT/US2013/068301 dated Jul. 4, 2014, 3 pages.
(Continued)

*Primary Examiner* — William N Harris
(74) *Attorney, Agent, or Firm* — Quinn IP Law

(57) ABSTRACT

A display unit for mounting in a vehicle may include an image generator, a display member, and a light source. The display member may be configured to move from a non-operational position to an operational position such that the display member is positioned to reflect light from the image generator in the operational position. The display member also includes an edge configured to refract light and/or
(Continued)

otherwise be illuminated. The light source may be configured to emit light to illuminate at least a portion of the edge of the display member. In some implementations, the light source may move when the display member is moved from the non-operational position to the operational position. In other implementations, the light source may be stationary. The display unit may also include a light guide to guide the light emitted by the light source to illuminate the edge.

20 Claims, 7 Drawing Sheets

(51) Int. Cl.
| | | |
|---|---|---|
| *B60Q 3/78* | (2017.01) | |
| *B60Q 3/80* | (2017.01) | |
| *B60Q 3/85* | (2017.01) | |
| *F21V 8/00* | (2006.01) | |
| *G02B 27/01* | (2006.01) | |
| *B60K 35/00* | (2006.01) | |
| *G03B 21/10* | (2006.01) | |
| *G03B 21/62* | (2014.01) | |

(52) U.S. Cl.
CPC .................. *B60Q 3/78* (2017.02); *B60Q 3/80* (2017.02); *B60Q 3/85* (2017.02); *G02B 27/01* (2013.01); *G02B 27/0101* (2013.01); *G02B 27/0149* (2013.01); *B60K 2350/2034* (2013.01); *G02B 2027/0154* (2013.01); *G03B 21/10* (2013.01); *G03B 21/62* (2013.01)

(56) References Cited

U.S. PATENT DOCUMENTS

| | | | |
|---|---|---|---|
| 5,975,728 A | * | 11/1999 | Weyer ...................... B60Q 3/18 362/23.19 |
| 2004/0135679 A1 | | 7/2004 | Kushida et al. |
| 2005/0111231 A1 | * | 5/2005 | Crodian ............... B60Q 1/1423 362/545 |
| 2008/0238838 A1 | * | 10/2008 | Cunningham ......... B60K 37/00 345/83 |
| 2010/0046082 A1 | | 2/2010 | Croy et al. |

FOREIGN PATENT DOCUMENTS

| | | |
|---|---|---|
| JP | 2001-159545 A | 6/2001 |
| WO | 2008063632 A2 | 5/2008 |
| WO | WO-2008/063632 A2 | 5/2008 |

OTHER PUBLICATIONS

International Preliminary Report on Patentability and Written Opinion of the International Searching Authority in PCT/US2013/068301, dated May 19, 2016, 5 pages.
Office Action dated Sep. 5, 2017, received in corresponding Japanese application No. 2016-552404, 5 pages.

* cited by examiner

VISUAL AUGMENTATION OF AN EDGE OF A DISPLAY SURFACE

CROSS REFERENCE TO RELATED APPLICATIONS

The present application is a U.S. National Stage of International Application No. PCT/US2013/068301 filed on Nov. 4, 2013, the entire disclosure of which is incorporated herein by reference.

FIELD

The present application relates generally to the field of display units for vehicles. Specifically, the application relates to a system for providing a virtual image, the virtual image displaying information such as, but not limited to, vehicle operating information (e.g., vehicle speed, engine speed, fuel levels and/or warnings). More particularly, the application relates to visual augmentation of an edge of a display member or display surface of the system.

BACKGROUND

Vehicles have utilized a display unit, sometimes called a head-up display unit (HUD), to provide a virtual image in a driver's field of vision. Displays generally include a projector that provides an image onto a semi-reflective display surface of a display member. The semi-reflective surface can be a windshield or a semi-reflective member (e.g., mirror, glass, etc.) disposed in front of the windshield. The reflection of the image is seen by a driver and, in some implementations, may be perceived as existing at some point beyond the display surface, generally outside the vehicle. Displays that provide a virtual image are desirable because information is at a focal length more consistent within the driver's field of vision and the driver does not have to look down to access the information as with a conventional instrument cluster.

In some implementations, it may be desirable to provide a display unit with a display member that is configured to be retracted and generally hidden within the dashboard when not in use. It may be desirable to provide visual indicia on an edge of the display member of the display unit. Such visual indicia may be useful to distinguish the display member to a driver. In some implementations, it may be desirable to permit the visual indicia to be customizable by a user. In further implementations, it may be desirable to utilize the visual indicia communicate information to a driver. In still other implementations, it may be desirable to have uniform illumination of the visual indicia along the edge of the display surface. In yet other implementations, it may be desirable to limit the light leakage from the light sources, such as light emitting diodes (LEDs), to the outside of the display unit other than along the edges of the display member.

What is needed is a system and/or method that satisfies one or more of these needs or provides other advantageous features. Other features and advantages will be made apparent from the present specification. The teachings disclosed extend to those embodiments that fall within the scope of the claims, regardless of whether they accomplish one or more of the aforementioned needs.

SUMMARY

One implementation relates to a display unit for mounting in a vehicle. The display unit may include an image generator, a display member, and a light source. The display member may be configured to move from a non-operational position to an operational position. The display member may be positioned to reflect light from the image generator in the operational position. The display member may include an edge configured to refract light. The light source may light source may be configured to emit light to illuminate at least a portion of the edge of the display member.

Another implementation relates to a display unit for mounting in a vehicle. The display unit may include an image generator, a display member, a light source, and a light guide. The display member may be configured to move from a non-operational position to an operational position. The display member may be positioned to reflect light from the image generator in the operational position. The display member may include a grained edge configured to refract light. The light source may be configured to emit light to illuminate at least a portion of the edge of the display member. The light guide may be interposed between the light source and the display member. The light guide may be configured to guide emitted light to a portion of the edge of the display member.

Yet a further implementation relates to display unit for mounting in a vehicle. The display unit may include a housing, an image generator, a display member, a light emitting diode, and a light guide. The image generator may be disposed within the housing. The display member may be configured to move from a non-operational position within the housing to an operational position. The display member may be positioned to reflect light from the image generator in the operational position extending a portion of the display member outside of the housing. The display member may include a grained edge configured to refract light. The light emitting diode may be disposed within the housing and configured to emit light to illuminate at least a portion of the edge of the display member. The light guide may be interposed between the light emitting diode and the display member. The light guide may be configured to guide emitted light to a portion of the edge of the display member. The light guide may be further configured to substantially limit light leakage out of the housing other than the emitted light to illuminate the edge of the display member.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
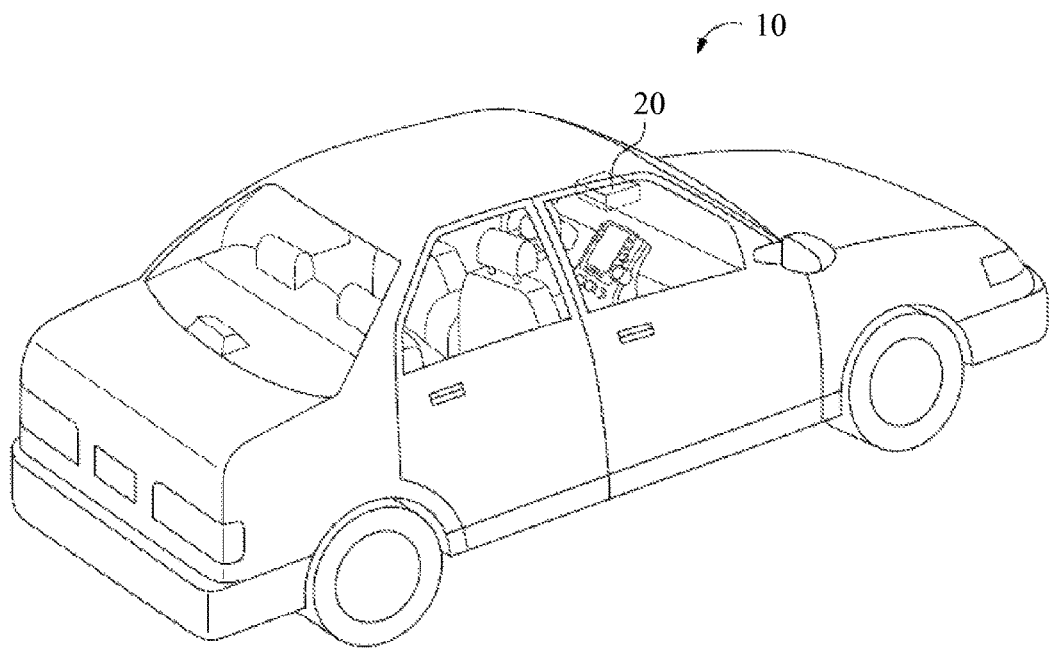
FIG. 1 is a schematic isometric view of a vehicle with a display unit according to an exemplary embodiment.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Before turning to the figures which illustrate the exemplary embodiments in detail, it should be understood that the application is not limited to the details or methodology set forth in the following description or illustrated in the figures. It should also be understood that the phraseology and terminology employed herein is for the purpose of description only and should not be regarded as limiting.

Referring generally to the figures, various configurations for visually augmenting, such as through illumination, an edge of a display member, such as a combiner/mirror for a HUD, are shown that may be utilized with a display unit, according to various exemplary embodiments. The visual augmentation of the edge of the display member may generally comprise one or more light sources, such as LEDs. The visual augmentation may only illuminate the edge of the display while still permitting visualizations, such as numbers, images, etc., to be displayed on a main surface of the display member. In some implementations, the light sources may be mounted to stationary separate printed circuit boards (PCBs) or the light sources may be mounted to moveable PCBs that move with the display member when the display member is deployed. In other implementations, the light sources may be mounted to a main PCB. A light guide may be provided to guide light emitted by the light source to a portion of the edge of the display member to illuminate the edge of the display member. In some implementations, the portion of the edge of the display member may include an angled portion configured to refract the emitted light through the edge of the display member.

In some implementations, it may be useful to configure the display unit in a manner such that the display member and/or the light sources may be repaired or replaced in an easy manner. In still other implementations, it may be useful to have a uniform illumination of the edge of the display member. The deployment of the display member may be managed for the uniform illumination, in some implementations, and may prevent any clash due to the display member being deployed. In still further instances, it may be preferable to prevent light leakage from the light sources outside of a housing for the display unit other than the emitted light to illuminate the edge of the display member. In some instances, an intensity of the light source may be varied from a powered off or minimum intensity to a maximum intensity.

In some implementations, two light sources may be used. The two light sources may have the same visual indicia, such as a color, or may have different visual indicia or colors. The intensity of the light sources may be varied from a powered off or minimum intensity to a maximum intensity. Such varying of intensity may be used to provide information, both when the two light sources have the same visual indicia or color (e.g., varying intensity of one light source in a manner similar to a turn signal indicator) or when the two light sources have differing visual indicia or colors to vary an intersection of two different colored light sources. That is, there may be a region of overlap where light from a first light source and a second light source are both refracted by the edge of the display surface to provide a combined colored region. The overlap region may be used to communicate information to a driver based on the position of the overlap region relative to the first light source and/or the second light source. For example, if the first light source emits light of a first color at a low intensity or is off and the second light source emits light of a second color, which is different from the first color, at a higher intensity such that the two colors may overlap at a region near the first light source (or only the second color is shown if the first light source is off). Thus, a first portion of the edge may be illuminated with the first color from the first light source and a second portion of the edge may be illuminated with the second color from the second light source. An overlap region may have a color that is a mixture of the colors of the first and second light sources. For example, a red first light source and a blue second light source may result in a red first portion, a blue second portion, and a purple overlap region. Of course other colors may be used, such as yellow, green, orange, white, indigo, violet, etc. In some instances, the colors of the first and second light sources may be primary colors such that the overlap region is a secondary color. In other instances, the colors of the first and second light sources may be secondary colors such that the overlap region is a tertiary color. In some other instances, the color of the first light source may be a first color and the color of the second light source may be a second color such that the overlap region is a third color. Of course any other color or combination of colors may be used.

Figure 2:
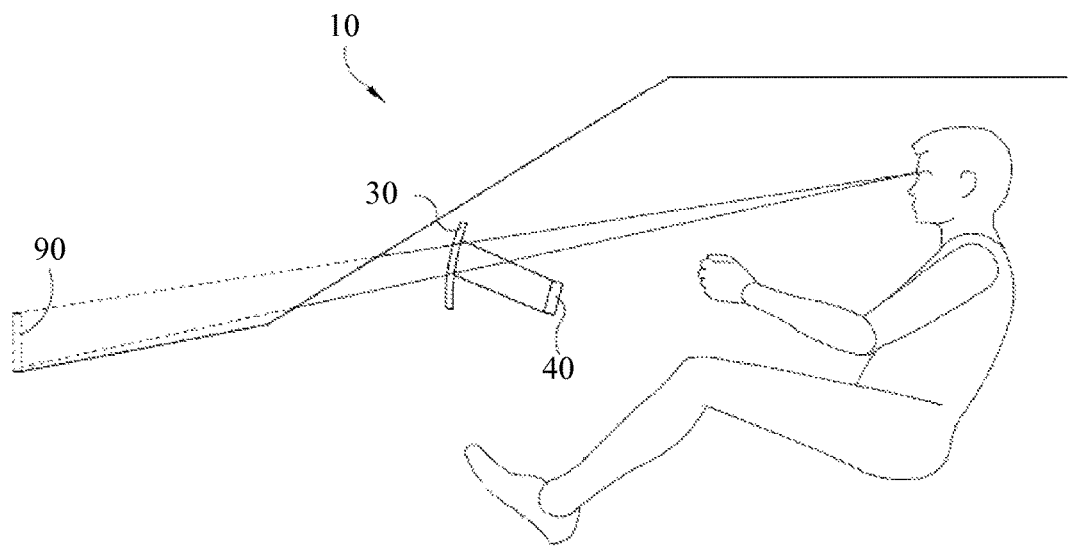
FIG. 2 is a schematic partial side elevation view of a vehicle having a display unit according to an exemplary embodiment and showing an exemplary placement of a virtual image.

Referring to FIG. 1, a vehicle 10 is shown with a display unit 20 according to an implementation. In some implementations, the display unit 20 may be integrated into the vehicle 10 or the display unit 20 may be a separate unit that may be added to the vehicle 10 by a purchaser as an aftermarket product. Referring to FIG. 2, the display unit 20 is mounted on or in the dashboard of the vehicle 10 generally in line with the driver and above a steering wheel of the vehicle 10. The display unit 20 (or portions thereof) can be situated on a top surface of the dashboard, below the top surface of the dashboard, or integrated into the dashboard. In an implementation, the display unit 20 is formed to a single unitary piece of equipment, the display unit 20 having a top surface flush with a top surface of the dashboard such that, when a display member 30 of the display unit 20 is in a non-operational position, the top surface of the display unit 20 and the top surface of the dashboard form a substantially uniform top surface, thereby hiding the presence of the display unit 20 in the vehicle 10. When the display unit 20 is activated, such as in response to activating the vehicle 10, unlocking a driver's door, and/or another triggering event, then the display member 30 of the display unit 20 may be deployed from the non-operational position to an operational position extending above the dashboard.

The display unit 20 includes a display member 30 that may be a semi-reflective member (e.g., a screen, mirror, combiner, glass piece, plastic piece, etc.). The display unit 20 further includes an image generator 40 (e.g., display, source, projector, etc.). The display member 30 and/or the image generator 40 may be selectively deployed or revealed when the display unit 20 is activated. In some implementations, the display unit 20 may include moveable doors, ramps, or other features that may be actuated when the display unit 20 is activated such that the display member 30 and/or the image generator 40 may be deployed and/or utilized. The image generator 40 may generally be a projector of any suitable past, present, or future technology capable of casting an image on the display member 30. The image generator 40 is generally configured to project an image onto a face of the display member 30. The image generator 40 may use lenses to project the image or may operate without the use of lenses. The display member 30 may be configured to simply reflect the image and/or may both reflect and focus the image generally at the eyes of the driver (e.g., at the head of the driver, above the vehicle's dash, above the steering wheel, at the headrests, at a passenger location, etc.) to create a virtual display 90. In some implementations, the virtual display 90 may appear to be located at some point on an opposite side of the display member 30 from the driver. The virtual display 90 allows information (e.g., vehicle speed, engine RPM, fuel level, navigation information, point of interest information, map information, hands-free call information, music information, HVAC information, direction information, etc.) to be displayed in the driver's field of vision (e.g. out the windshield of the vehicle), allowing the driver to see the information without looking down at a conventional gauge cluster.

FIG. 2 shows one exemplary location of the virtual display 90, generally along the hood of the vehicle 10 and approximately 2 meters from the driver. According to other exemplary embodiments, the display unit 20 may be used to display other information or images. For example, the display unit 20 may display images from cameras or other sources (e.g., an image of the area behind the vehicle) or may display images that enhance the area seen by the driver out the windshield (e.g., a night vision overlay, a road line overlay, road sign enhancement, road detail enhancement, navigational aides, map information, point of interest information, etc.).

Figure 3:
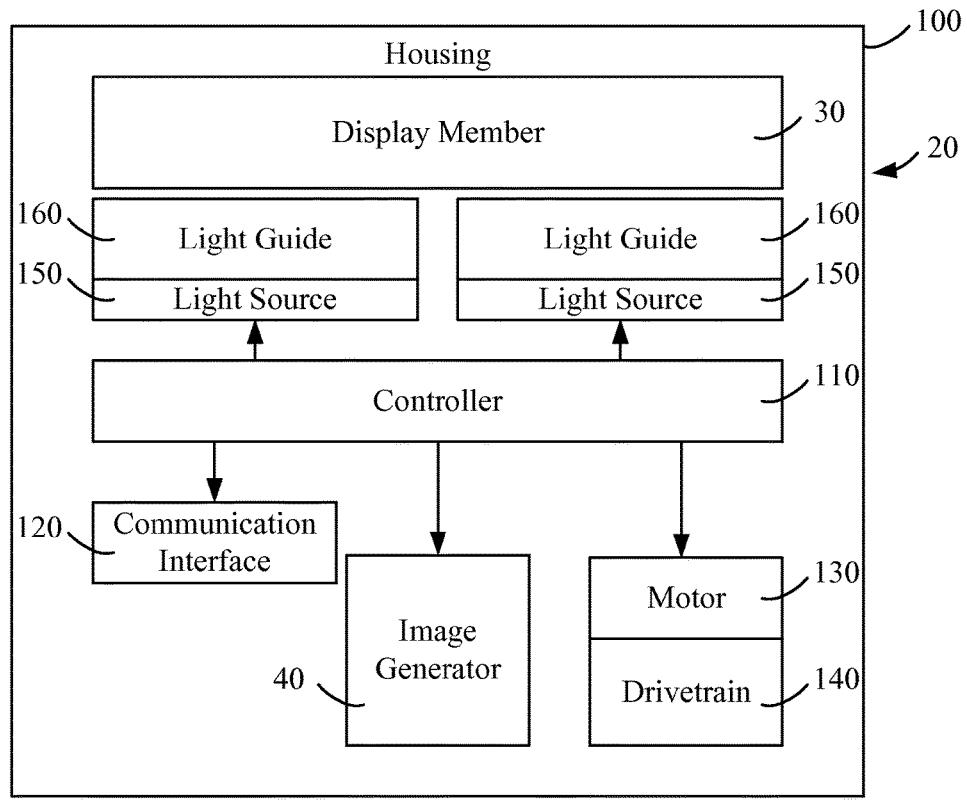
FIG. 3 is a schematic block diagram of components of a display unit according to an exemplary embodiment.
Figure 4:
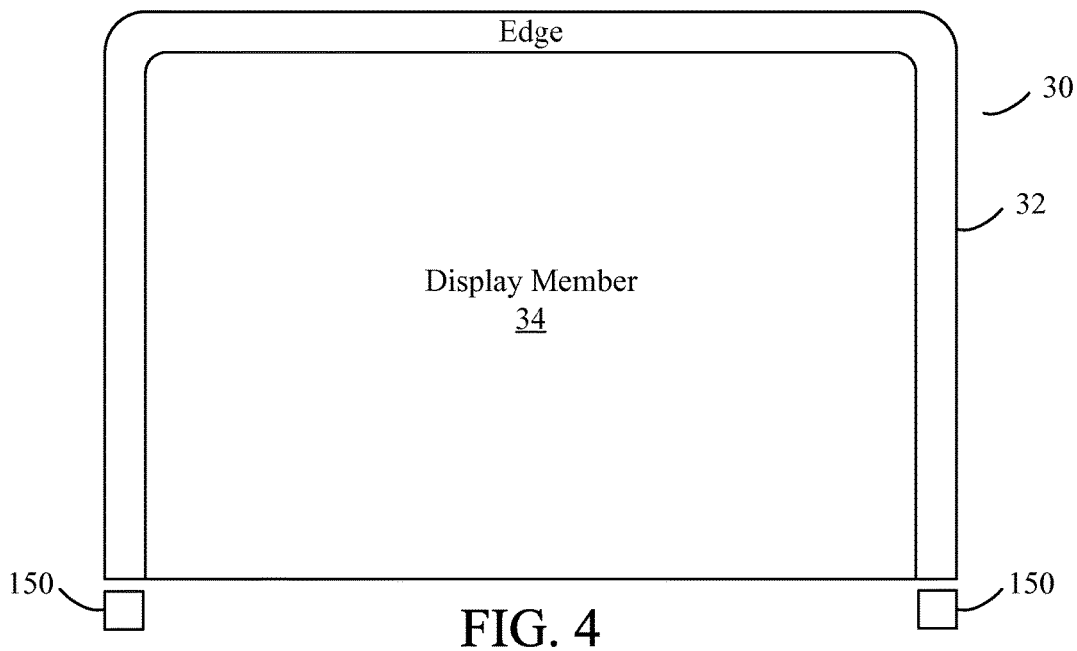
FIG. 4 is a schematic elevation view of a deployed display member having visual indicia on an edge of the display member according to an exemplary embodiment.
Figure 5:
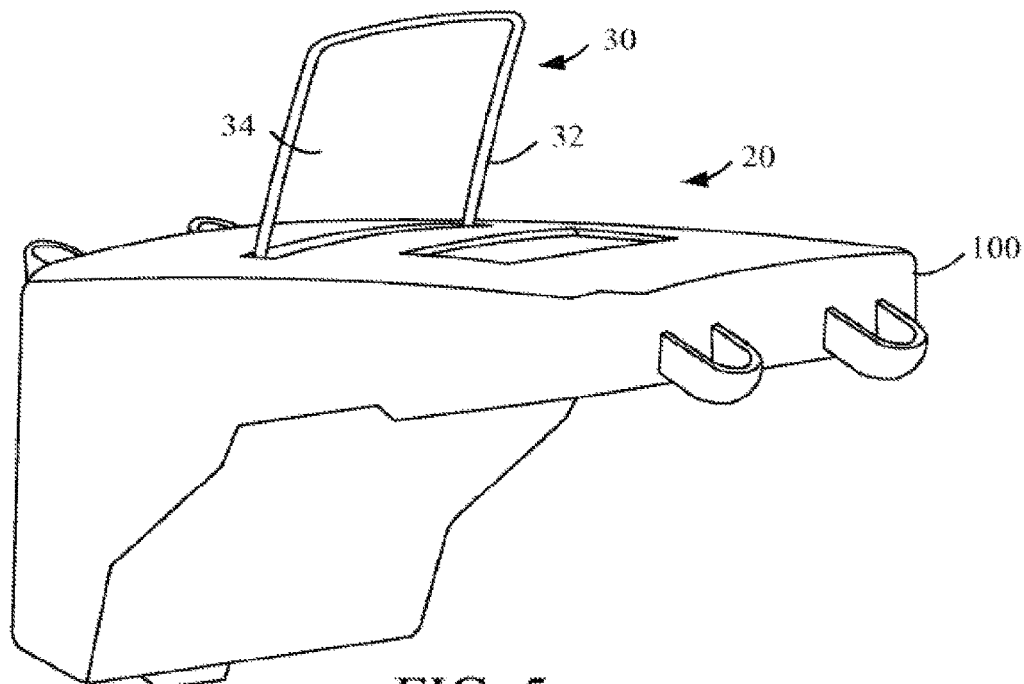
FIG. 5 is a schematic isometric view of a display unit having a display member shown in a deployed position and having an edge that may be visually augmented according to an exemplary embodiment.

Referring generally to FIGS. 3-5, an example display unit 20 is depicted. FIG. 3 is a schematic block diagram of components of a display unit 20 according to an exemplary embodiment. The display unit 20 includes a housing 100, the display member 30, a controller 110, a communication interface 120, the image generator 40, a motor 130, a drivetrain 140, one or more light sources 150, and one or more light guides 160. When in a first or closed configuration, the housing 100 of the display unit 20 presents a generally continuous contour with (or within) the dashboard of vehicle 10. The housing 100 of the display unit 20 may include a first door or flap (e.g., horizontal door, top door, etc.) and/or a second door or flap (e.g., vertical door, front door, etc.). The first door may be actuatable from a first, closed position to a second, open position such that the image generator may project an image or other visual indicia onto a deployed display member 30. The second door may be actuatable from a first, closed position to a second, open position such that the display member 30 may be extended therethrough. The housing 100 may further include features (such as outwardly extending protrusions (e.g., brackets)) that are configured to allow the display unit 20 to be coupled to the vehicle 10. When the display unit 20 moves the display member 30 to a second or operational position, the first door pivots downward to reveal image generator 40 and the second door rotates to allow the display member 30 to deploy from inside housing 100 (such as shown in FIG. 5). The display member 30 is deployed out of the housing 100 and pivots to a generally vertical orientation in the operational position.

The first door and/or the second door may be controlled via mechanical components coupled to the drivetrain 140 that is coupled to the motor 130. The motor 130 is in electrical communication with the controller 110 such that the controller 110 may control the operation of the motor 130 (such as through pulse width modulation). The drivetrain 140 may include a plurality of gears, cams and/or other components to control the operation of the first door, second door, and/or the deployment of the display member 30 via operation of the motor 130 using the controller 110, as will be described in greater detail herein. The controller 110 may include a processor and a memory. The processor may be implemented as a general purpose processor, an application specific integrated circuit (ASIC), one or more field programmable gate arrays (FPGAs), a group of processing components, or other suitable electronic processing components. The memory may be one or more devices (e.g., RAM, ROM, Flash memory, hard disk storage, etc.) for storing data and/or computer code for completing and/or facilitating the various processes described herein. The memory may be or include non-transient volatile memory or non-volatile memory. The memory may include data base components, object code components, script components, or any other type of information structure for supporting the various activities and information structures described herein. The memory may be communicably connected to the processor and includes computer code or instructions for executing one or more processes described herein.

The controller 110 is communicatively coupled to the communication interface 120. The communication interface 120 may include wired communication features, such as USB ports, serial ports, IEEE 1394 ports, optical ports, parallel ports, OBD II, and/or any other suitable wired communication port. Data cables from the vehicle (e.g., vehicle media system, vehicle control system, vehicle ECU, vehicle data bus, etc.) may be coupled to a back or underneath portion of the display unit 20 to transfer vehicle information, via communications interface 120, to the display unit 20 (and the image generator 40 in particular). In other implementations, the communication interface 120 may include a wireless communication interface (e.g., using a Bluetooth® communication protocol, an IEEE 802.11 protocol, an IEEE 802.16 protocol, a cellular signal, a Shared Wireless Access Protocol-Cord Access (SWAP-CA) protocol, a wireless USB protocol, or any other suitable wireless).

According to an exemplary embodiment, the display member 30 comprises a member of a semi-reflective material (or has been treated or formed so that it is semi-reflective). The display member 30 might be a one piece member, or might be made of multiple layers, pieces, or sections. Referring to FIG. 4, the display member 30 includes an edge 32 configured to refract light such that the edge 32 is illuminated by one or more light sources 150. The edge 32 may include impurities in the display member 30 to refract light (e.g., metallic particles or other materials to disperse or refract light) and/or the edge 32 may be modified, such as by sand-blasting or acid etching (to produce a grain feature or frosted glass feature), ground glass, or other modification to the edge 32 of the display member 30 such that light is refracted by the edge 32. The display member 30 is shown, in FIG. 5, as having a generally parabolic body. The display member 30 may be shaped and/or have material properties such that a main portion 34 is configured to reflect an image while still maintaining at least partial transparency. A parabolic shape of the display member 30 may be configured to focus the image projected from the image generator 40 (and reflected back at the eyes of the driver). According to various other exemplary embodiments, the display member 30 may be of any shape, size, or material or materials suitable for reflecting an image from image generator 40.

Referring back to FIG. 3, light sources 150 may be electrically coupled to the controller 110 such that the controller may control the power, intensity, color, or other feature of the light source 150. In an implementation, the light sources 150 may include light emitting diodes (including OLEDs and/or PLEDs). The light emitting diodes may include color-changing LEDs such that the controller 110 may change the color of light emitted by the LEDs. In other implementations, other light sources 150 may be used, such as incandescent light sources, fluorescent light sources, electroluminescent light sources, gas discharge light sources, EL wire, plasma light sources, etc. In some implementations, a light guide 160 may be provided to guide light emitted by the light source 150 to a portion of the display member 30, such as an end of the edge 32, as will be described in greater detail herein. The light guide 160 may include a substantially enclosed tubular member (e.g., an elongated square tube, an elongated cylindrical tube, or other geometric tubular members), a channel (e.g., a pair of guide plates, a U-shaped channel, etc.), or other substantially rigid constructions to guide light emitted from a light source 150 to a portion of the display member 30, such as an end of the edge 32. In other implementations, the light guide 160 may include flexible or other semi-deformable components (e.g., fiber optic cabling) configured guide light emitted from a light source 150 to the portion of the display member 30, such as an end of the edge 32. In some implementations the light guides 160 may be omitted.

According to an exemplary embodiment, image generator 40 is a backlit liquid crystal display, but could be of any suitable past, present or future technology (e.g., DLP, OLED, plasma, LED, etc.). The backlighting may be provided by a plurality of light emitting diodes such as super bright white LEDS producing illumination of approximately 6000 candelas/m$^2$. According to other exemplary embodiments the backlighting could be provided by another lighting technology of the past, present, or future (e.g., a cathode ray tube, organic LEDs, florescent lamp etc.).

The display member 30 may be coupled to a holder (e.g., blade, base, etc.). The holder may be coupled to an actuation and rotation assembly (not shown) that is coupled and controlled via drivetrain 140. In some implementations, the actuation and rotation assembly may include rollers, guide channels, and a worm gear such that the worm gear drives the display member 30 from a non-operational position to an operational, deployed position via movement of one or more rollers along one or more guide channels. In other implementations, the actuation and rotation assembly may include a shaft or axle coupled to one or more trolleys that ride along rails provided on either side of the display member 30. The motor 130 and the drivetrain 140 may control the movement of the one or more trolleys along the rails to deploy and/or retract the display member 30. According to an exemplary embodiment, the rails are metal members and are configured to help stabilize the holder and display member 30 as the holder and display member 30 are moved from a closed position (i.e., non-operational position) to an operational position and during use when the display member 30 is in the operational position.

The motor 130 and the drivetrain 140 are configured to facilitate travel of display member 30 between a closed position (non-operational position) and a deployed position (operational position). The display unit 20 and, more particularly, the drivetrain 140 may be configured in accordance with at least some of the teachings of U.S. Pat. No. 8,077,396 to Croy et al., entitled "Apparatus and System for Providing a Virtual Display for a Vehicle," issued Dec. 13, 2011. According to an exemplary embodiment, the motor 130 may be a DC motor. According to other exemplary embodiments, the motor 130 may be a stepper motor or any other suitable source for providing motive force to the drivetrain 140. According to an exemplary embodiment, the motor 130 is stationary, and the stationary placement or nature of the motor 130 prevents and/or reduces the need for trailing wires or cables that would be needed to provide power to a motor that moved with display member 30 and/or the holder. According to an exemplary embodiment, the motor 130 is disposed on the same end of the display unit 20 as the image generator 40. According to various other exemplary embodiments, the motor 130 is disposed on the opposite end of the display unit 20.

Referring to FIG. 5, the display unit 20 is shown in the operational position with the display member 30 having a portion extended outside of the housing 100 and in an operational position (e.g., a position whereby the display member 30 may be generally perpendicular to its orientation when display unit 20 is in the non-operational position). According to an exemplary embodiment, the display member 30 faces the image generator 40 when in an operational position.

When display unit 20 is opening or moving to an operational position, the motor 130 may engage the drivetrain 140 in a first direction. When display unit 20 is returning to a closed configuration (e.g., the display member 30 returns to a non-operational position), the motor 130 may engage the drivetrain 140 in the opposite direction. This movement retracts the display member 30 back into the housing 100.

While the display unit 20 is shown having an image generator 40 that projects an image directly onto the display member 30, it should be understood that many other variations are possible. For instance, according to other exemplary embodiments, the image generator 40 may be oriented differently relative to the display member 30 and the image may be reflected off one or more intermediate mirrors between the image generator 40 and the display member 30. According to other exemplary embodiments, the image may be magnified, shrunk, transformed, or otherwise distorted by intermediate lenses or mirrors between the image generator 40 and the display member 30.

Figure 6:
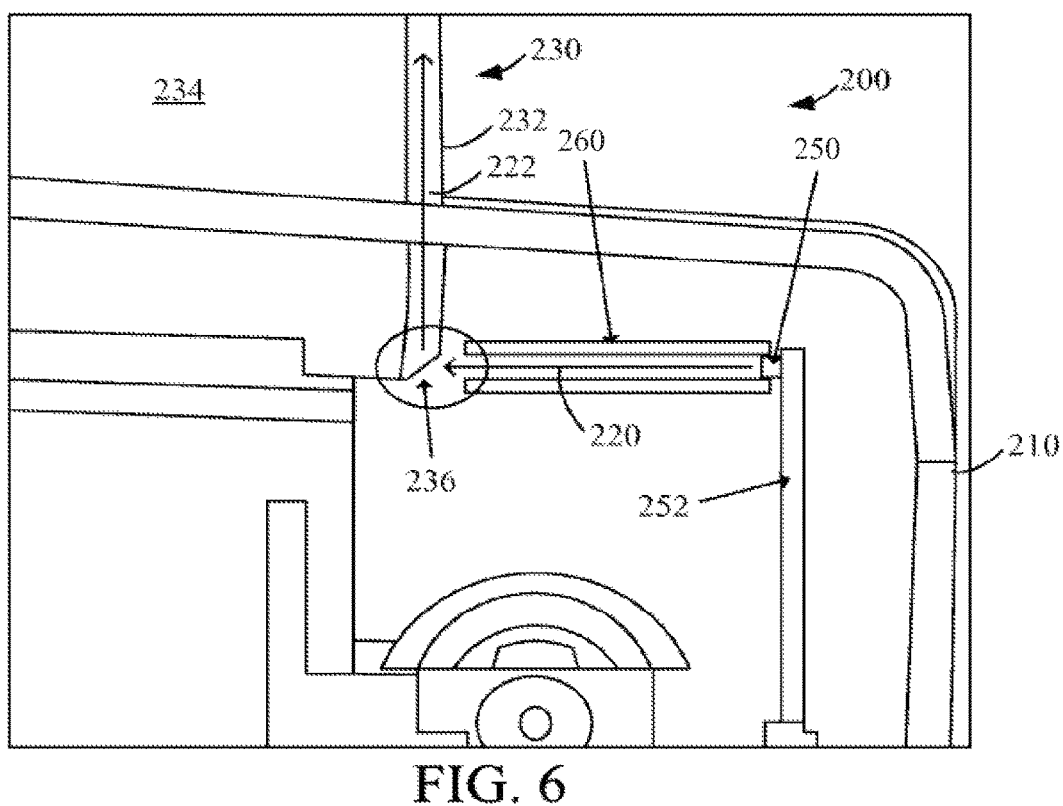
FIG. 6 is a schematic partial rear elevation view of a display unit showing a printed circuit board (PCB) having a light emitting diode (LED) emitting light to a portion of a deployed display member to generate visual indicia along an edge of the display member according to an exemplary embodiment.

While the foregoing has generally described a display unit 20 having a deployable display member 30 and image generator 40 for displaying images and/or other visual indicia using the display member 30, configurations for the display member, the one or more light sources, and the one or more light guides will now be described in greater detail. Referring to FIG. 6, an example display unit 200 includes a display member 230 shown deployed. The display member 230 includes an edge 232 and a main portion 234. According to an exemplary embodiment, the display member 230 comprises a member of a semi-reflective material (or has been treated or formed so that it is semi-reflective). The display member 230 might be a one piece member, or might be made of multiple layers, pieces, or sections. The display member 230 includes an edge 232 configured to refract light such that the edge 232 is illuminated by one or more light sources 250. The edge 232 may include impurities in the display member 230 to refract light (e.g., metallic particles or other materials to disperse or refract light) and/or the edge 232 may be modified, such as by sand-blasting or acid etching (to produce a grain feature or frosted glass feature), ground glass, or other modification to the edge 232 of the display member 230 such that light is refracted by the edge 232. The display member 230 may have a generally parabolic shape. The display member 230 may be shaped and/or have material properties such that the main portion 234 is configured to reflect an image while still maintaining at least partial transparency. A parabolic shape of the display member 230 may be configured to focus the image projected from an image generator (not shown) to be reflected back at the eyes of the driver. According to various other exemplary embodiments, the display member 230 may be of any shape, size, or material or materials suitable for reflecting an image from the image generator.

In the example shown, the edge 232 includes an angled portion 236. The angled portion 236 is configured to receive incoming emitted light from a first direction, indicated by arrow 220, and refract the light to a second direction, indicated by arrow 222, such that the light travels through the edge 232 of the display member 230 to illuminate the edge 232. The angle of the angled portion 236 may be determined based upon a refractive index of the material used for the display member 230, a refractive index for a medium through which the light travels from the light source 250 (e.g., air, plastic within a light guide 250 or another medium), and either a desired angle of refraction (to refract into the edge 232) or a desired angle of incidence (e.g., if an internal configuration of the display unit 200 limits the angle from which the light may be emitted from the light source 250).

The light source 250 of the present example is shown mounted to a separate stationary PCB 252 mounted within a housing 210 of the display unit 200. The stationary PCB 252 does not move when the display member 230 moves from the non-operational position to the operational position. In some other implementations, the light source 250 may be directly mounted to the housing 210 and the PCB 252 may be omitted. A light guide 260 is shown communicating emitted light from the light source 250 to the angled portion 236 of the display member 230. The light guide 260 may be configured to substantially limit light leakage out of the housing 210 other than the emitted light to illuminate the edge 232 of the display member 230. The light guide 260 may include a substantially enclosed tubular member (e.g., an elongated square tube, an elongated cylindrical tube, or other geometric tubular members), a channel (e.g., a pair of guide plates, a U-shaped channel, etc.), or other substantially rigid constructions to guide light emitted from a light source 250 to a portion of the display member 230, such as the angled portion 236 of the edge 232. In other implementations, the light guide 260 may include flexible or other semi-deformable components (e.g., fiber optic cabling) configured guide light emitted from a light source 250 to the portion of the display member 230, such as the angled portion 236 of the edge 232. In some implementations the light guide 260 may be omitted.

Figure 7:
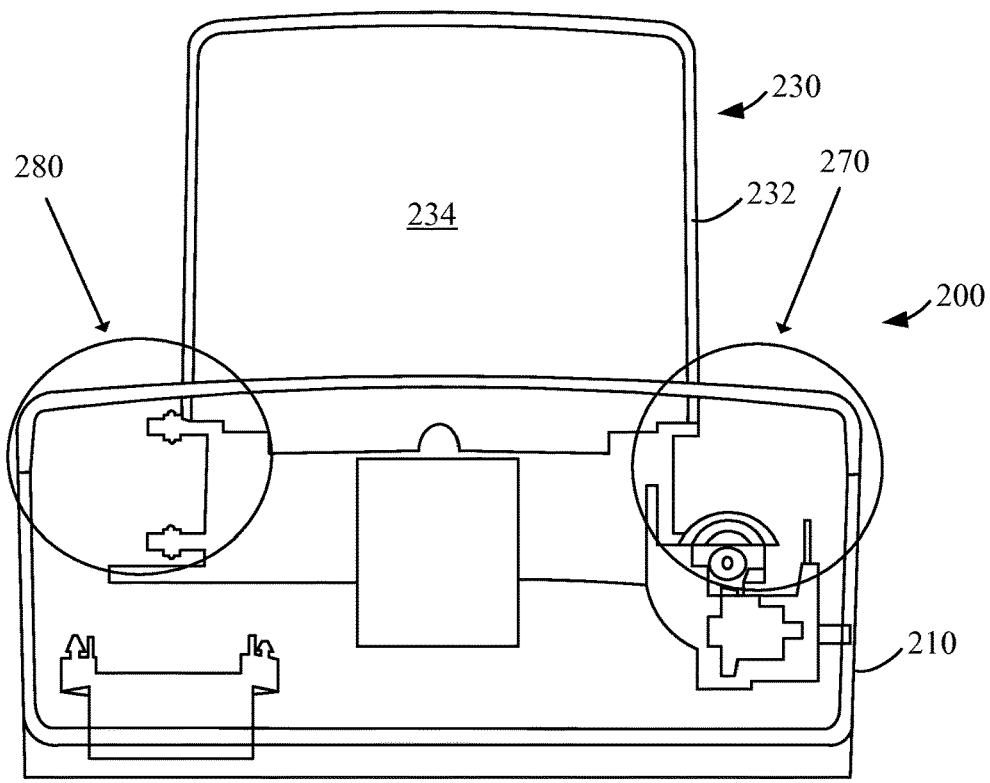
FIG. 7 is a schematic rear elevation view of a display unit showing regions for a first light assembly and a second light assembly.

While one example configuration for a light source 250, light guide 260, and angled portion 236 of the edge 232 is shown in FIG. 6, it should be understood that a second light source 250, light guide 260, and/or angled portion 236 of the edge 232 may be disposed on an opposite side of the display member 230 such that a first light source illuminates a first portion of the edge 232 and a second light source illuminates a second portion of the edge 232. For example, referring to FIG. 7, a first light source 250, a first light guide 260, and a first angled portion 236 of the edge 232 may be located in a first portion 270 of the housing 210 and a second light source 250, a second light guide 260, and a second angled portion 236 of the edge 232 may be located in a second portion 280 of the housing 210.

As will be described in greater detail below, the first light source 250 and the second light source 250 may emit light of the same color or may emit light of different colors. In some implementations, the color of the light emitted by the light sources 250 may be user-selectable and/or an intensity of the light emitted by the light sources 250 may be user-selectable. In still further implementations, the intensity of the emitted light may be variable, and may be controlled via a controller, such as controller 110 of FIG. 3, to modify the intensity of the emitted light to communicate information to a driver. In other implementations, the wherein a first light of the first light source 250 may be a first color and a second light of the 250 second light source may be a second color, different from the first color. The differing light colors may form a region, shown and described in greater detail in FIG. 13, of the edge 232 of the display member 230 that is indicated by an overlap or blending of the first color with the second color.

Figure 8:
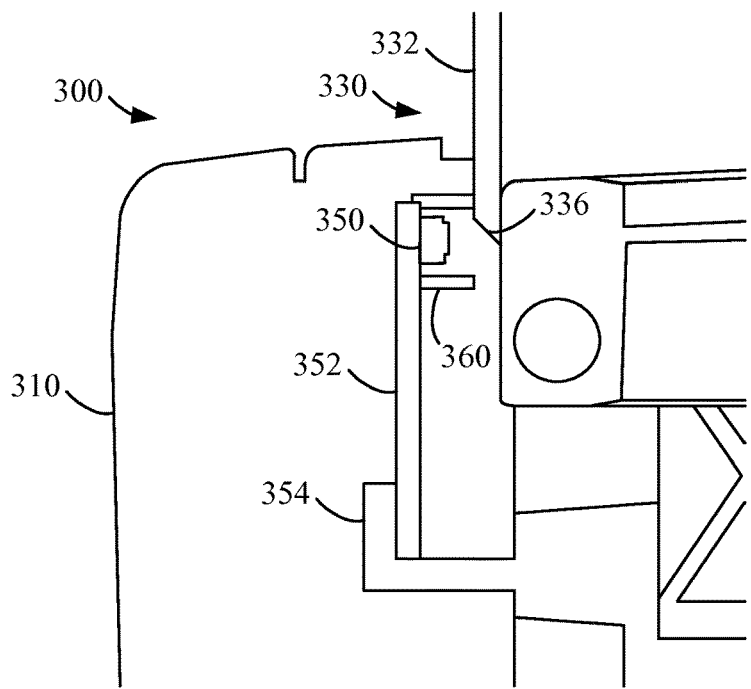
FIG. 8 is a schematic partial rear elevation view of a display unit showing a PCB having a LED emitting light to a portion of a deployed display member to generate visual indicia along an edge of the display member and a conveyor according to an exemplary embodiment.
Figure 9:
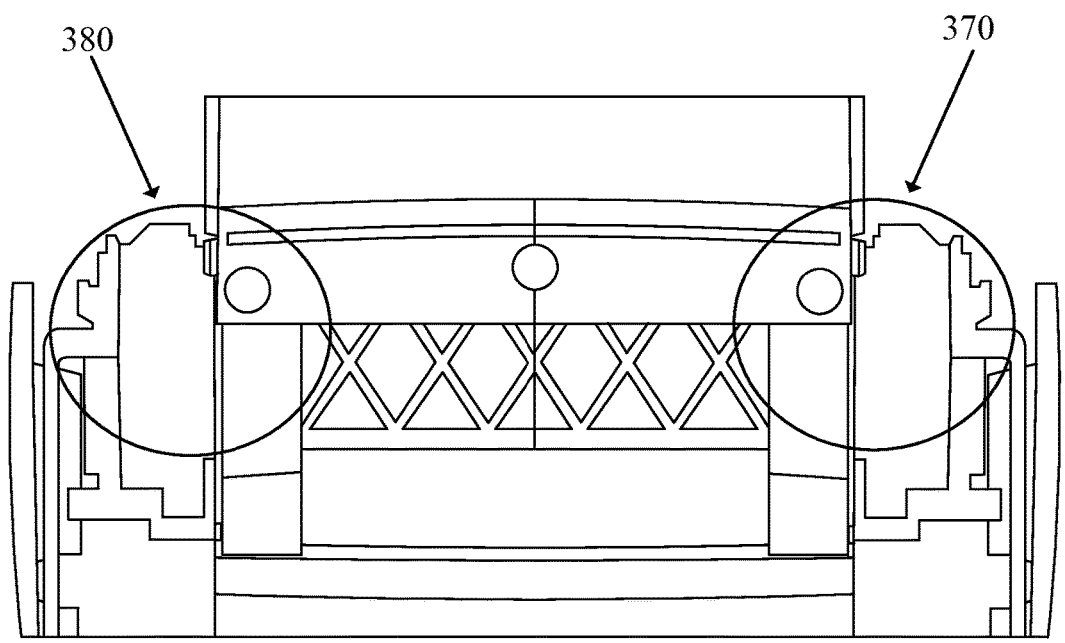
FIG. 9 is a schematic rear elevation view of another display unit showing regions for a first light assembly and a second light assembly.

In another configuration for a display unit 300, shown in FIGS. 8-9, a PCB 352 may instead be configured to move when a display member 330 is deployed or retracted. In some implementations the PCB 352 may be mounted to a conveyor 354 utilized to move the display member 330 from a retracted or closed position to a deployed or open position. The PCB 352 includes a light source 350 that substantially aligns with the angled portion 336 of the display member 330 to illuminate the edge 332 of the display member 330. In another example, the PCB 352 with the light source 350 may be mounted to a moveable trolley that is used to deploy the display member 330 and/or to a roller that moves within a guide channel when the display member 330 is deployed. In other implementations, the PCB 352 with the light source 350 may be moveable independently of the movement of the display member 330 (e.g., via another drivetrain coupled to the motor) or may be indirectly moved with the display member 330 (e.g., via a camming member or other mechanical interface that moves the PCB 352 to an operational position during at least a portion of the movement of the display member 330). In yet further implementations, the PCB 352 may be omitted and the light source 350 may be moveable with the display member 330 in any of the foregoing implementations.

A light guide 360 is shown communicating emitted light from the light source 350 to the angled portion 336 of the display member 330. The light guide 360 may be configured to substantially limit light leakage out of the housing 310 other than the emitted light to illuminate the edge 332 of the display member 330. The light guide 360 may include a substantially enclosed tubular member (e.g., an elongated square tube, an elongated cylindrical tube, or other geometric tubular members), a channel (e.g., a pair of guide plates, a U-shaped channel, etc.), or other substantially rigid constructions to guide light emitted from a light source 350 to a portion of the display member 330, such as the angled portion 336 of the edge 332. In other implementations, the light guide 360 may include flexible or other semi-deformable components (e.g., fiber optic cabling) configured guide light emitted from a light source 350 to the portion of the display member 330, such as the angled portion 336 of the edge 332. In some implementations the light guide 360 may be omitted.

While one example configuration for a light source 350, light guide 360, and angled portion 336 of the edge 332 is shown in FIG. 8, it should be understood that a second light source 350, light guide 360, and/or angled portion 336 of the edge 332 may be disposed on an opposite side of the display member 330 such that a first light source illuminates a first portion of the edge 332 and a second light source illuminates a second portion of the edge 332. For example, referring to FIG. 9, a first light source 350, a first light guide 360, and a first angled portion 336 of the edge 332 may be located in a first portion 370 of the housing 310 and a second light source 350, a second light guide 360, and a second angled portion 336 of the edge 332 may be located in a second portion 380 of the housing 310.

As will be described in greater detail below, the first light source 350 and the second light source 350 may emit light of the same color or may emit light of different colors. In some implementations, the color of the light emitted by the light sources 350 may be user-selectable and/or an intensity of the light emitted by the light sources 350 may be user-selectable. In still further implementations, the intensity of the emitted light may be variable, and may be controlled via a controller, such as controller 110 of FIG. 3, to modify the intensity of the emitted light to communicate information to a driver. In other implementations, the wherein a first light of the first light source 350 may be a first color and a second light of the 350 second light source may be a second color, different from the first color. The differing light colors may form a region, shown and described in greater detail in FIG. 13, of the edge 332 of the display member 330 that is indicated by an overlap or blending of the first color with the second color.

Figure 10:
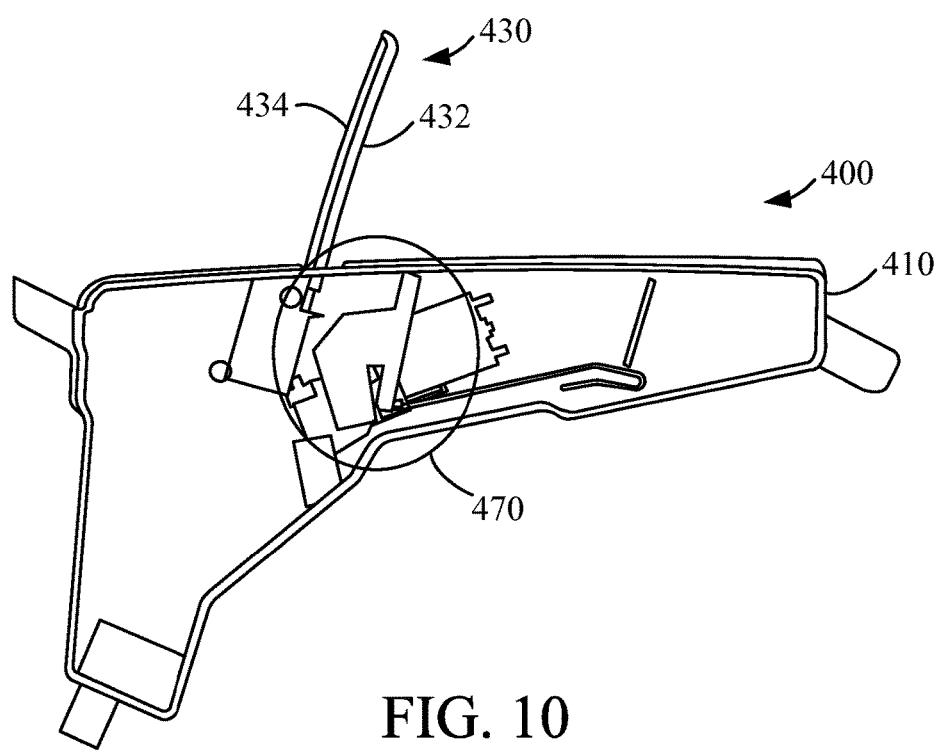
FIG. 10 is schematic side elevation view of a display unit according to an exemplary embodiment.
Figure 11:
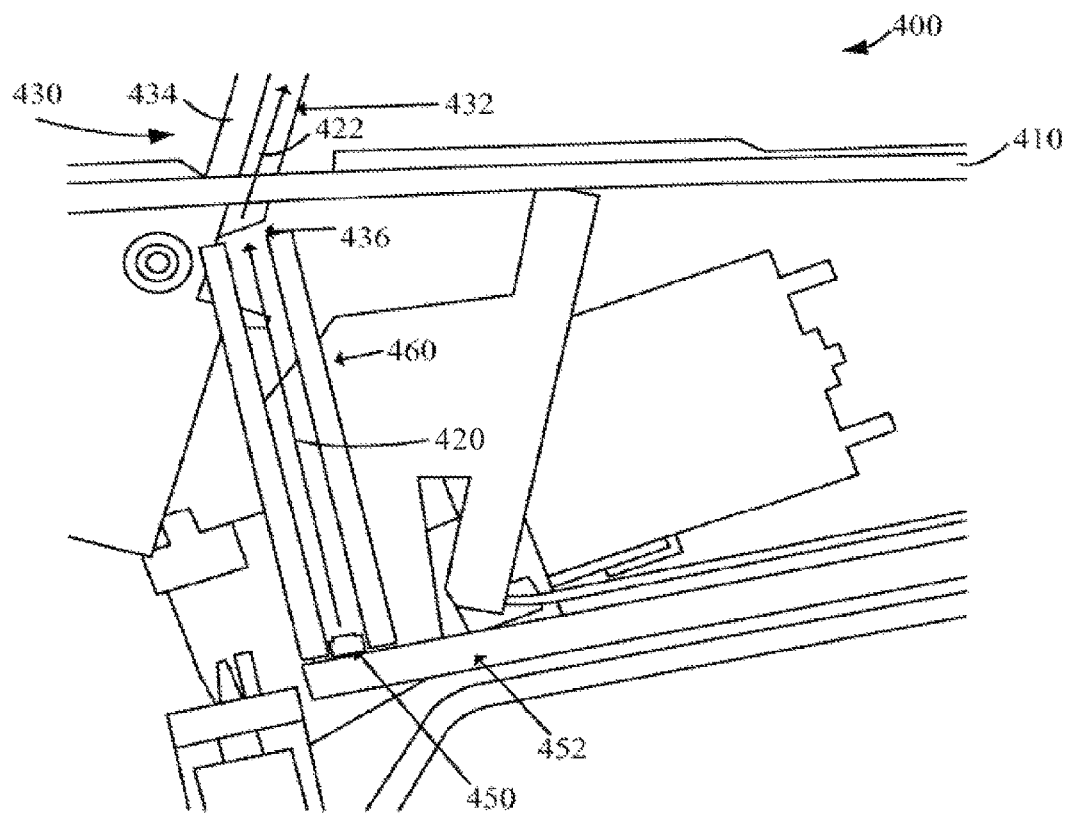
FIG. 11 is a schematic partial side elevation view of the display unit of FIG. 7 showing a main PCB having a LED emitting light to a portion of a deployed display member to generate visual indicia along an edge of the display member according to an exemplary embodiment.

Referring to FIGS. 10-11, an example display unit 400 includes a display member 430 shown deployed. FIG. 10 depicts a portion 470 of a housing 410 of the display unit 400 in which one or more light sources 450 may be positioned to illuminate an edge 432 of the display member 430. The display member 430 also includes main portion 434. According to an exemplary embodiment, the display member 430 comprises a member of a semi-reflective material (or has been treated or formed so that it is semi-reflective). The display member 430 might be a one piece member, or might be made of multiple layers, pieces, or sections. The display member 430 includes an edge 432 configured to refract light such that the edge 432 is illuminated by one or more light sources 450. The edge 432 may include impurities in the display member 430 to refract light (e.g., metallic particles or other materials to disperse or refract light) and/or the edge 432 may be modified, such as by sand-blasting or acid etching (to produce a grain feature or frosted glass feature), ground glass, or other modification to the edge 432 of the display member 430 such that light is refracted by the edge 432. The display member 430 may have a generally parabolic shape. The display member 430 may be shaped and/or have material properties such that the main portion 434 is configured to reflect an image while still maintaining at least partial transparency. A parabolic shape of the display member 430 may be configured to focus the image projected from an image generator (not shown) to be reflected back at the eyes of the driver. According to various other exemplary embodiments, the display member 430 may be of any shape, size, or material or materials suitable for reflecting an image from the image generator.

In the example shown in FIG. 11, the edge 432 includes an angled portion 436. The angled portion 436 is configured to receive incoming emitted light from a first direction, indicated by arrow 420, and refract the light to a second direction, indicated by arrow 422, such that the light travels through the edge 432 of the display member 430 to illuminate the edge 432. The angle of the angled portion 436 may be determined based upon a refractive index of the material used for the display member 430, a refractive index for a medium through which the light travels from the light source 450 (e.g., air, plastic within a light guide 450 or another medium), and either a desired angle of refraction (to refract into the edge 432) or a desired angle of incidence (e.g., if an internal configuration of the display unit 400 limits the angle from which the light may be emitted from the light source 450).

The light source 450 of the present example is shown mounted to a main PCB 452 mounted within a housing 410 of the display unit 400. The main PCB 452 may be configured to not move when the display member 430 moves from the non-operational position to the operational position. In another configuration, the main PCB 452 may instead be configured to move when the display member 430 is deployed or retracted.

In the example show, a light guide 460 is shown communicating emitted light from the light source 450 on the main PCB 452 to the angled portion 436 of the display member 430. The light guide 460 may be configured to substantially limit light leakage out of the housing 410 other than the emitted light to illuminate the edge 432 of the display member 430. The light guide 460 may include a substantially enclosed tubular member (e.g., an elongated square tube, an elongated cylindrical tube, or other geometric tubular members), a channel (e.g., a pair of guide plates, a U-shaped channel, etc.), or other substantially rigid constructions to guide light emitted from a light source 450 to a portion of the display member 430, such as the angled portion 436 of the edge 432. In other implementations, the light guide 460 may include flexible or other semi-deformable components (e.g., fiber optic cabling) configured guide light emitted from a light source 450 to the portion of the display member 430, such as the angled portion 436 of the edge 432. In some implementations the light guide 460 may be omitted.

While one example configuration for a light source 450, light guide 460, and angled portion 436 of the edge 432 is shown in FIG. 11, it should be understood that a second light source 450, light guide 460, and/or angled portion 436 of the edge 432 may be disposed on an opposite side of the display member 430 such that a first light source illuminates a first portion of the edge 432 and a second light source illuminates a second portion of the edge 432.

As will be described in greater detail below, the first light source 450 and the second light source 450 may emit light of the same color or may emit light of different colors. In some implementations, the color of the light emitted by the light sources 450 may be user-selectable and/or an intensity of the light emitted by the light sources 450 may be user-selectable. In still further implementations, the intensity of the emitted light may be variable, and may be controlled via a controller, such as controller 110 of FIG. 3, to modify the intensity of the emitted light to communicate information to a driver. In other implementations, the wherein a first light of the first light source 450 may be a first color and a second light of the 450 second light source may be a second color, different from the first color. The differing light colors may form a region, shown and described in greater detail in FIG. 13, of the edge 432 of the display member 430 that is indicated by an overlap or blending of the first color with the second color.

Figure 12:
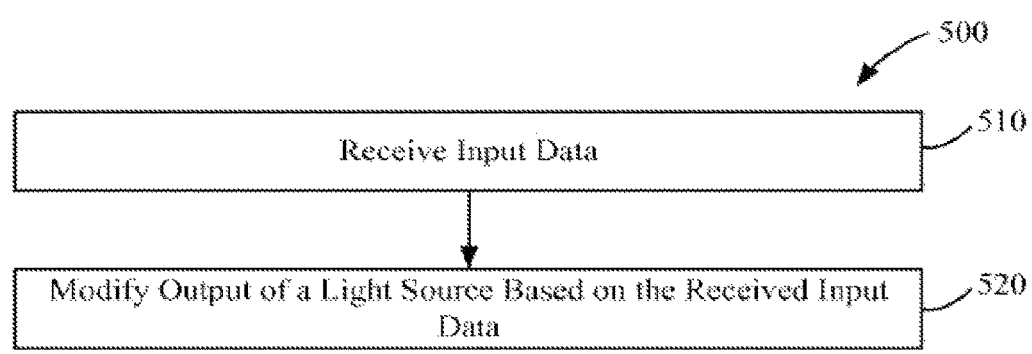
FIG. 12 is a flow diagram of an example process for receiving input data and modifying an intensity of a light source.

FIG. 12 is a flow diagram of an example process 500 for receiving input data and modifying an intensity of a light source. The process 500 may be implemented by a controller, such as controller 110 of FIG. 3, to control the activation and/or the intensity of the light emitted by one or more light sources. The process 500 includes receiving input data (block 510). The input data may be received via a communication interface, such as communication interface 120 of FIG. 3. The communication interface may include wired communication features, such as USB ports, serial ports, IEEE 1394 ports, optical ports, parallel ports, OBD II, and/or any other suitable wired communication port. Data cables from the vehicle (e.g., vehicle media system, vehicle control system, vehicle ECU, vehicle data bus, etc.) may be coupled to a back or underneath portion of the display unit to transfer vehicle information, via communications interface, to the display unit. In other implementations, the communication interface may include a wireless communication interface (e.g., using a Bluetooth® communication protocol, an IEEE 802.11 protocol, an IEEE 802.16 protocol, a cellular signal, a Shared Wireless Access Protocol-Cord Access (SWAP-CA) protocol, a wireless USB protocol, or any other suitable wireless).

The received input data may include a variety of input data, including, but not limited to, data indicative of a user selection for a light color, a user selection of an intensity of a light source, a collision indication, a speed indication, a brake indication, a system warning indication, a rotation rate, a speed rate, a tachometer, a speedometer, a downloading rate, an upload rate, a signal strength, a charging rate, a charging status, a fuel level, a fuel consumption rate, a fuel efficiency, a temperature, an air conditioner temperature setting, a fan speed, a transmission temperature, a battery charging rate, a battery discharging rate, a battery charge level, a tire pressure, a tire temperature, an oil level, an oil temperature, an oil purity, a temperature of a glow plug, an engine temperature, a differential temperature, a seat temperature, a cruise control speed, an acceleration rate, an adaptive cruise control speed, a traction control status, a differential status, a shift efficiency, a door status, a door position, a gas door position, a window status, a window position, a moon roof status, a moon roof position, a convertible top status, a convertible top position, a lift gate status, a lift gate position, a washer fluid level, a transmission fluid level, a distance-to-empty, an incline position, an incline rate of change, a body roll rate, a body roll position, a lateral acceleration, a turbo temperature, a turbo pressure, a turbo speed, a turbo boost, a radio station, a preset, a balance, a vent position, a distance to an object, a back-up sensor indicator, a blind spot indicator, a lane departure indicator, a Bluetooth® status, a Bluetooth® signal strength, a cupholder temperature, a cupholder temperature setting, a compartment temperature, a compartment temperature setting, a windshield wiper rate, a sideview mirror position, a parking brake status, a brake temperature, a brake disc status, a tire wear status, a compass direction, a headlight status, a blinker status, a trunk position, a hood position, an air recycle status, a time, a sun position, a navigation indicator, a media item status, a media selection, a brake rate, a volume, a fuel filter status, an oil filter status, an air filter status, a brake fluid status, a brake fluid temperature, a supercharger status, a supercharger boost, a compression ratio, a spring damper status, a radiator fluid level, an ignition timing, a fuel-air mixture, a light intensity, a transmission gear, a clutch position, a clutch wear status, a lap time, a relative time, a heart rate, a breathing rate, a body temperature, a button selection, a training status, an exterior noise level, a propeller pitch, a propeller speed, an altitude, a control surface position, a rate of climb, a rate of descent, directional information, and/or any other input data.

Based on the received input data, the output of a light source may be modified (block 520). In some implementations, the output of a light source may be modified by changing a color of a light source, such as in response to input data indicative of a user selection of a light source color. In another implementation, the output of a light source may be modified by changing an intensity of a light source, such as in response to input data indicative of a user selection of a light source intensity. In other implementations, the intensity of the emitted light may be variable and a controller may be configured to modify the intensity of the emitted light to automatically communicate information to a driver in response to received input data. For example, the controller may rapidly flash (e.g., by increasing and decreasing the intensity) the light sources in response to collision indication, a speed indication, a brake indication, and/or a system warning indication to communicate such an indication to the driver. In one implementation, when input data indicative of a potential collision is received (e.g., via an object detection system, such as a radar system mounted near a front portion of the vehicle), the controller may rapidly flash both the light sources to communicate such an indication. In other implementations, the controller may, either in addition to or in lieu of the rapid flashing, control the light source color to communicate the information to the driver, such as by also changing the color of the light sources to red.

In some further implementations, the controller may modify the output of the light sources to communicate directional information to a driver based on the received input data. For example, the received input data may include turn signal indicator input data. A controller may be configured to periodically flash a corresponding light source (e.g., left or right light source) to indicate the activated turn signal in response to the input data. In another configuration, the received input data may include navigation directions. For example, a portable navigation device (e.g., a GPS module, a cell phone with GPS capabilities, etc.) and/or an onboard GPS system may send directional input data to the controller of the display unit. In some implementations, the controller may flash or otherwise indicate such directional information to a driver in addition to or in lieu of other communications of the directional information (e.g., visual maps, audible instructions, etc.). In an example, the controller may flash a corresponding light source to indicate when a driver is to turn (e.g., within 100 to 50 feet of an indicated navigation turn). Of course still other information may be communicated to a driver and/or other occupant of the vehicle via control of the one or more light sources.

Figure 13:
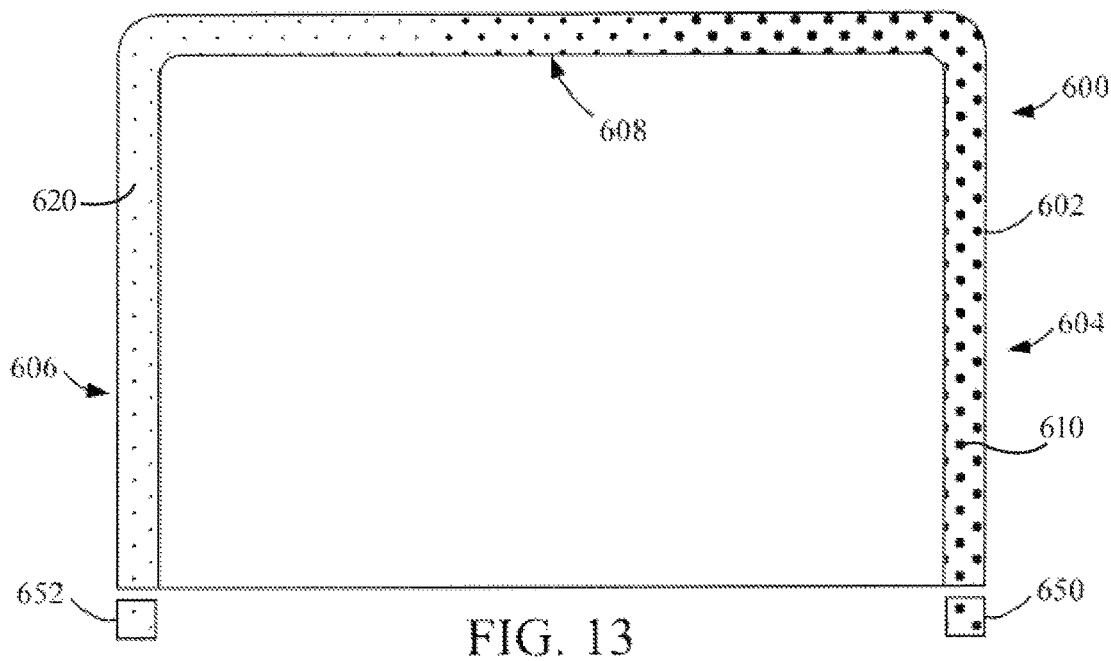
FIG. 13 is a schematic elevation view of a deployed display member having first visual indicia on a first portion of the edge of the display member and a second visual indicia on a second portion of the edge of the display member according to an exemplary embodiment.

FIG. 13 is a schematic elevation view of a deployed display member 600 having first visual indicia 610 on a first portion 604 of an edge 602 of the display member 600 and a second visual indicia 620 on a second portion 606 of the edge 602 of the display member 600. In the example shown, a first light source 650 is schematically shown for illuminating the first portion 604 and a second light source 652 is schematically shown illuminating the second portion 606. An overlap region 608 is shown where the light from the first light source 650 overlaps with the light from the second light source 652. The first light of the first light source 650 may be a first color and the second light of the second light source 652 may be a second color. The first color and the second color may be different colors. A region of the edge 602 of the display member 600 is indicated by an overlap 608 of the first color and the second color. Thus, the first portion 604 of the edge 602 may have a color associated with the first light source 650, the second portion 606 may have a color associated with the second light source 652, and the overlap region 608 may have a color that is a mixture of the colors of the first light source 650 and the second light source 652. For example, a red first light source 650 and a blue second light source 652 may result in a red first portion 604, a blue second portion 606, and a purple overlap region 608. Of course other colors may be used, such as yellow, green, orange, white, indigo, violet, etc. In some instances, the colors of the first and second light sources 650, 652 may be primary colors such that the overlap region 608 is a secondary color. In other instances, the colors of the first and second light sources 650, 652 may be secondary colors such that the overlap region 608 is a tertiary color. Of course any other color or combination of colors may be used.

As the intensity of the second light source 652 is increased, the region 608 where the two colors overlap may shift further from the second light source 652 and closer to the first light source 650. In some instances, the first light source 650 may simultaneously reduce intensity. In some implementations, the overlap region 608 may be positioned at a midpoint that is equidistant between the first light source 650 and the second light source 652. Such a midpoint overlap region 608 may occur when the first light source 650 and the second light source 652 are both at a maximum intensity. In some other implementations, the overlap region 608 may be positioned at a midpoint when the first light source 650 and the second light source 652 are both at an intermediate intensity. The intermediate intensity may be a middle intensity and/or may be any other intensity between the maximum and the minimum and/or the powered off state of the first light source 650 and/or the second light source 652. It should be understood that in any of the foregoing configurations, the first portion 604 from the first light source 650 and the second portion 606 from the second light source 652 are substantially equal in size and/or intensity with an overlap region 608 disposed between the first portion 604 and the second portion 606.

The first light source 650 may decrease in intensity to a minimum or powered off intensity while the second light source 652 maintains a maximum intensity and/or increases to a maximum intensity. Thus, it should be understood that the first portion 604 of refracted or reflected light from the first light source 650 may decrease in size and/or intensity while the second portion 606 of refracted or reflected light from the second light source 652 may increase in size and/or intensity. Accordingly, the overlap region 608 may move from the midpoint to a region substantially near the first light source 650. When the first light source 650 is at a minimum or powered off intensity and the second light source 652 is at a maximum intensity, the overlap region 608 may be substantially near the first light source 650. Conversely, the second light source 652 may decrease in intensity to a minimum or powered off intensity while the first light source 650 maintains a maximum intensity and/or increases to a maximum intensity. Thus, it should be understood that the second portion 606 of refracted or reflected light from the second light source 652 may decrease in size and/or intensity while the first portion 604 of refracted or reflected light from the first light source 650 may increase in size and/or intensity. Accordingly, the overlap region 608 may move from the midpoint to a region substantially near the second light source 652. When the second light source 652 is at a minimum or powered off intensity and the first light source 650 is at a maximum intensity, the overlap region 608 may be substantially near the second light source 652.

Thus, it should be understood that the first light source 650 and the second light source 652 may be varied in intensity such that the overlap region 608 of light refracted or reflected by the edge 602 may be modified relative to the first light source 650 and the second light source 652. Such an overlap region 608 may be used to communicate information to a driver or other occupant of a vehicle.

Figure 14:
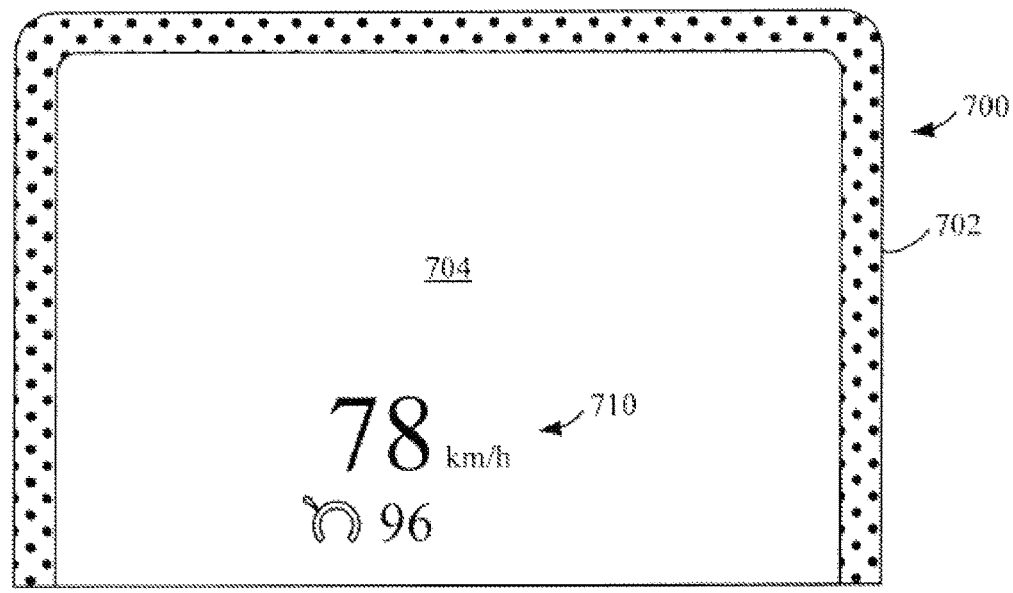
FIG. 14 is an elevation view of a deployed display member displaying information on a main portion of the display member and showing uniform illumination of the edge of the display member.

FIG. 14 is an elevation view of a deployed display member 700 displaying information 710 on a main portion 704 of the display member 700 and showing uniform illumination of the edge 702 of the display member 700.

It should be noted that references to "front," "back," "rear," "upward," "downward," "inner," "outer," "interior," "exterior," "right," and "left" in this description are merely used to identify the various elements as they are oriented in the FIGS. These terms are not meant to limit the element which they describe, as the various elements may be oriented differently in various applications.

It should further be noted that for purposes of this disclosure, the term "coupled" means the joining of two members directly or indirectly to one another. Such joining may be stationary in nature or moveable in nature and/or such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions. Software implementations could be accomplished with standard programming techniques with rule based logic and other logic to accomplish the various connection steps, processing steps, comparison steps and decision steps.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made by one of ordinary skill in the art without departing from the spirit and scope of the appended claims. All implementations that come within the spirit and scope of the following claims and equivalents thereto are claimed.

What is claimed is:

1. A display unit for mounting in a vehicle, the display unit comprising:
    an image generator;
    a display member moveable between a non-operational position and an operational position, wherein the display member is hidden from view of a driver when disposed in the non-operational position, and wherein the display member is positioned in view of the driver to reflect light from the image generator at an eye of the driver when disposed in the operational position, the display member including an edge having a light refracting feature operable to refract light; and
    a light source configured to emit light onto the light refracting feature of the edge, whereby the light refracting feature refracts the light to illuminate at least a portion of the edge of the display member.

2. The display unit of claim 1, wherein the light refracting feature includes a grained surface on the edge.

3. The display unit of claim 1, wherein the light source is a light emitting diode.

4. The display unit of claim 1 further comprising:
    a light guide interposed between the light source and the display member, wherein the light guide is configured to guide emitted light to a portion of the display member.

5. The display unit of claim 4, wherein the portion of the display member comprises an angled portion, wherein the angled portion is configured to redirect the emitted light through the edge of the display member.

6. The display unit of claim 5, wherein the light source is mounted to a separate stationary printed circuit board within the display unit, wherein the stationary printed circuit board does not move when the display member moves from the non-operational position to the operational position.

7. The display unit of claim 5, wherein the light source is mounted to a separate printed circuit board configured to move with the display member when the display member moves from the non-operational position to the operational position.

8. The display unit of claim 5, wherein the light source is mounted to a main printed circuit board.

9. The display unit of claim 1 wherein a color of the emitted light is user-selectable.

10. The display unit of claim 1, wherein an intensity of the emitted light is user-selectable.

11. The display unit of claim 1, wherein an intensity of the emitted light is variable, wherein a controller is configured to modify the intensity of the emitted light to communicate information to a driver.

12. The display unit of claim 11, wherein the information comprises at least one of a collision indication, a speed indication, a brake indication, or a system warning indication.

13. The display unit of claim 1, wherein the light source is a first light source emitting a first light to illuminate a first portion of the edge of the display member, the display unit further comprising:
a second light source emitting a second light to illuminate at least a second portion of the edge of the display member.

14. The display unit of claim 13, wherein the first light of the first light source is a first color and the second light of the second light source is a second color, wherein the first color and the second color are different colors, wherein a region of the edge of the display member is indicated by an overlap of the first color and the second color.

15. The display unit of claim 14, wherein a first intensity of the first light source is variable, wherein a controller is configured to modify the first intensity of the emitted first light to communicate information to a driver.

16. The display unit of claim 15, wherein the information comprises information indicative of at least one of a rotation rate, a speed rate, a tachometer, a speedometer, a downloading rate, an upload rate, a signal strength, a charging rate, a charging status, a fuel level, a fuel consumption rate, a fuel efficiency, a temperature, an air conditioner temperature setting, a fan speed, a transmission temperature, a battery charging rate, a battery discharging rate, a battery charge level, a tire pressure, a tire temperature, an oil level, an oil temperature, an oil purity, a temperature of a glow plug, an engine temperature, a differential temperature, a seat temperature, a cruise control speed, an acceleration rate, an adaptive cruise control speed, a traction control status, a differential status, a shift efficiency, a door status, a door position, a gas door position, a window status, a window position, a moon roof status, a moon roof position, a convertible top status, a convertible top position, a lift gate status, a lift gate position, a washer fluid level, a transmission fluid level, a distance-to-empty, an incline position, an incline rate of change, a body roll rate, a body roll position, a lateral acceleration, a turbo temperature, a turbo pressure, a turbo speed, a turbo boost, a radio station, a preset, a balance, a vent position, a distance to an object, a back-up sensor indicator, a blind spot indicator, a lane departure indicator, a Bluetooth® status, a Bluetooth® signal strength, a cupholder temperature, a cupholder temperature setting, a compartment temperature, a compartment temperature setting, a windshield wiper rate, a sideview mirror position, a parking brake status, a brake temperature, a brake disc status, a tire wear status, a compass direction, a headlight status, a blinker status, a trunk position, a hood position, an air recycle status, a time, a sun position, a navigation indicator, a media item status, a media selection, a brake rate, a volume, a fuel filter status, an oil filter status, an air filter status, a brake fluid status, a brake fluid temperature, a supercharger status, a supercharger boost, a compression ratio, a spring damper status, a radiator fluid level, an ignition timing, a fuel-air mixture, a light intensity, a transmission gear, a clutch position, a clutch wear status, a lap time, a relative time, a heart rate, a breathing rate, a body temperature, a button selection, a training status, an exterior noise level, a propeller pitch, a propeller speed, an altitude, a control surface position, a rate of climb, or a rate of descent.

17. The display unit of claim 13, wherein a first intensity of the first light source is variable, wherein a controller is configured to modify the first intensity of the emitted first light to communicate information to a driver.

18. The display unit of claim 17, wherein the information comprises directional information.

19. A display unit for mounting in a vehicle, the display unit comprising:
an image generator;
a display member moveable between a non-operational position and an operational position, wherein the display member is hidden from view of a driver of the vehicle when disposed in the non-operational position, and wherein the display member is positioned in view of the driver to reflect light from the image generator at an eye of the driver when disposed in the operational position, the display member including a grained edge configured to refract light;
a light source configured to emit light onto the grained edge, whereby the grained edge refracts the light to illuminate at least a portion of the edge of the display member; and
a light guide interposed between the light source and the display member, wherein the light guide is configured to guide emitted light to a portion of the edge of the display member.

20. A display unit for mounting in a vehicle, comprising:
a housing;
an image generator disposed within the housing;
a display member configured to move from a non-operational position within the housing to an operational position extending a portion of the display member outside of the housing, wherein the display member is positioned to reflect light from the image generator in the operational position, the display member having a grained edge configured to refract light;
a light emitting diode disposed within the housing and configured to emit light to illuminate at least a portion of the edge of the display member; and
a light guide interposed between the light emitting diode and the display member, wherein the light guide is configured to guide emitted light to a portion of the edge of the display member, wherein the light guide is further configured to substantially limit light leakage out of the housing other than the emitted light to illuminate the edge of the display member.

* * * * *